(12) United States Patent
Reda

(10) Patent No.: US 9,988,284 B2
(45) Date of Patent: Jun. 5, 2018

(54) SYSTEM, METHOD, AND APPARATUS FOR WATER DESALINATION

(71) Applicant: Shaker Ahmed Reda, Akron, OH (US)

(72) Inventor: Shaker Ahmed Reda, Akron, OH (US)

( * ) Notice: Subject to any disclaimer, the term of this patent is extended or adjusted under 35 U.S.C. 154(b) by 267 days.

(21) Appl. No.: 14/807,355

(22) Filed: Jul. 23, 2015

(65) Prior Publication Data

US 2016/0251237 A1  Sep. 1, 2016

Related U.S. Application Data

(63) Continuation-in-part of application No. 14/631,947, filed on Feb. 26, 2015.

(Continued)

(51) Int. Cl.
| | |
|---|---|
| *C02F 1/14* | (2006.01) |
| *B01D 3/42* | (2006.01) |
| *B01D 3/10* | (2006.01) |
| *C02F 1/04* | (2006.01) |
| *B01D 1/00* | (2006.01) |
| *B01D 1/28* | (2006.01) |
| *B01D 3/06* | (2006.01) |
| *B01D 5/00* | (2006.01) |
| *C02F 1/06* | (2006.01) |
| *C02F 101/10* | (2006.01) |
| *C02F 103/08* | (2006.01) |

(52) U.S. Cl.
CPC .............. *C02F 1/14* (2013.01); *B01D 1/0035* (2013.01); *B01D 1/28* (2013.01); *B01D 3/06* (2013.01); *B01D 3/106* (2013.01); *B01D 3/4211* (2013.01); *B01D 5/0063* (2013.01); *B01D 5/0066* (2013.01); *C02F 1/041* (2013.01); *C02F 1/06* (2013.01); *C02F 2101/10* (2013.01); *C02F 2103/08* (2013.01); *C02F 2201/32* (2013.01)

(58) Field of Classification Search
CPC . C02F 1/30; B01D 3/10; B01D 5/0003; F28B 1/00; F28B 1/06
See application file for complete search history.

(56) References Cited

U.S. PATENT DOCUMENTS

| | | | |
|---|---|---|---|
| 4,302,297 A | 11/1981 | Humiston | |
| 5,441,606 A | 8/1995 | Schlesinger et al. | |

(Continued)

FOREIGN PATENT DOCUMENTS

WO   WO 81/02154   8/1981

*Primary Examiner* — Brian R Gordon
(74) *Attorney, Agent, or Firm* — Oblon, McClelland, Maier & Neustadt, L.L.P.

(57) ABSTRACT

A desalination system includes a vertical column with a lower end submerged into a body of liquid to be treated. The column has a dark-colored outer surface able to absorb electromagnetic energy, and at least one vacuum compressor is connected to provide a vacuum pressure in the vertical column such that the liquid is drawn into the vertical column through openings in the vertical column. A condensing dome has a main shell and that receives vapor of the liquid in the vertical column via a vapor port joining the vertical column and the condensing dome. A wind-driven outer turbine surrounds the main shell of the condensing dome and draws outside air into a space around the main shell of the condensing dome. A tank is connected to the condensing dome via a pipe and receives desalinated liquid from the condensing dome.

17 Claims, 9 Drawing Sheets

Related U.S. Application Data

(60) Provisional application No. 62/157,843, filed on May 6, 2015.

(56) References Cited

U.S. PATENT DOCUMENTS

| | | | |
|---|---|---|---|
| 5,857,344 | A | 1/1999 | Rosenthal |
| 6,083,382 | A | 7/2000 | Bird |
| 8,049,193 | B1 | 11/2011 | Appleby et al. |
| 8,083,948 | B2 | 12/2011 | Ito et al. |
| 8,142,663 | B2 | 3/2012 | Francisco et al. |
| 8,182,693 | B2 | 5/2012 | Wilkins et al. |
| 8,186,518 | B2 | 5/2012 | Barker et al. |
| 8,206,557 | B2 | 6/2012 | Burke et al. |
| 8,341,961 | B2 | 1/2013 | Glynn |
| 8,585,882 | B2 | 11/2013 | Freydina et al. |
| 8,685,252 | B2 | 4/2014 | Vuong et al. |
| 8,707,947 | B2 | 4/2014 | Hollis et al. |
| 8,739,774 | B2 | 6/2014 | O'Donnell et al. |
| 8,752,542 | B2 | 6/2014 | O'Donnell et al. |
| 2005/0120715 | A1* | 6/2005 | Labrador ............... F01K 27/00 60/618 |
| 2016/0369646 | A1* | 12/2016 | Hendrix ............... F03D 3/0427 |
| 2017/0110883 | A1* | 4/2017 | Tabe ..................... H02J 4/00 |

* cited by examiner

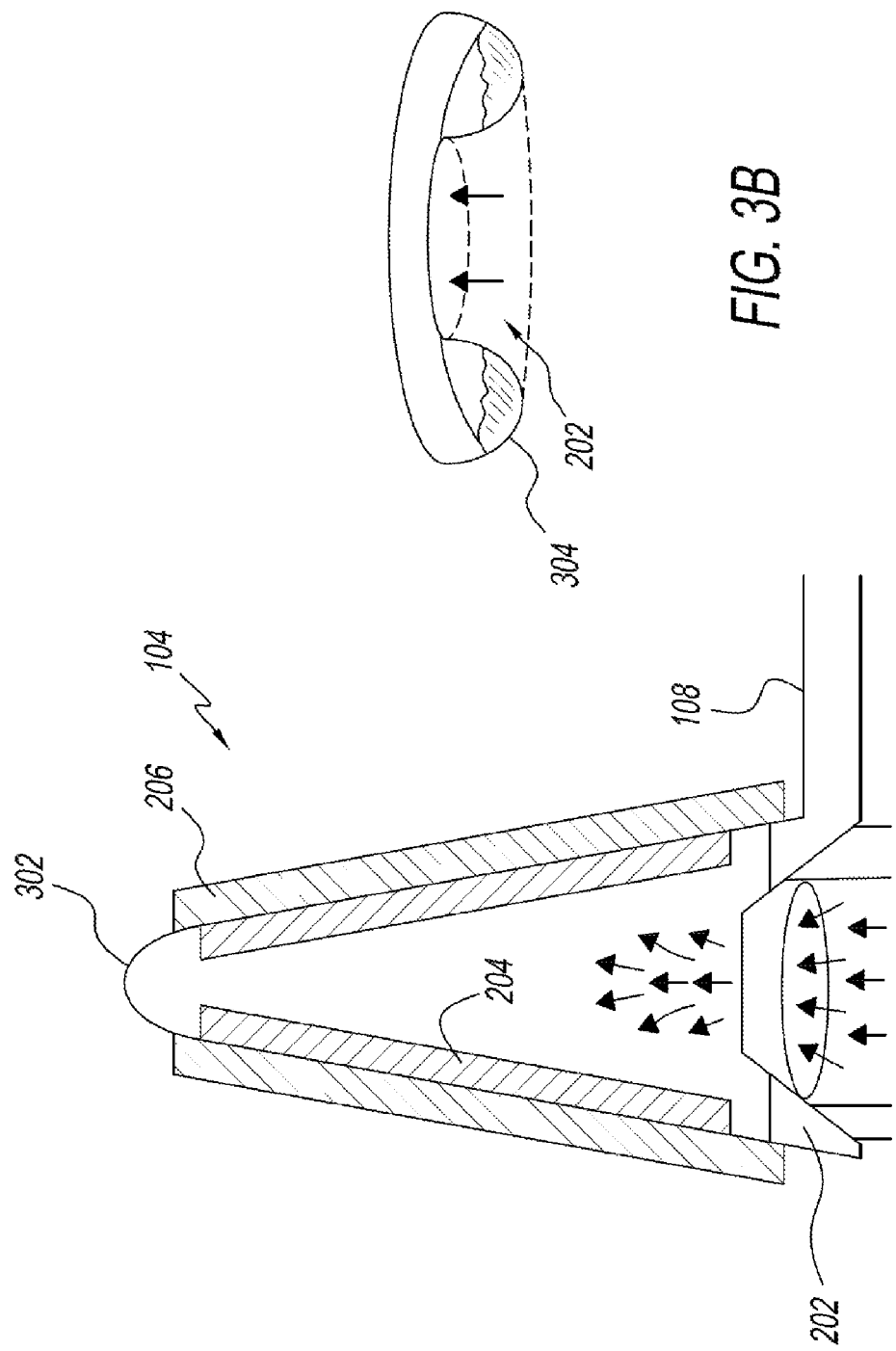

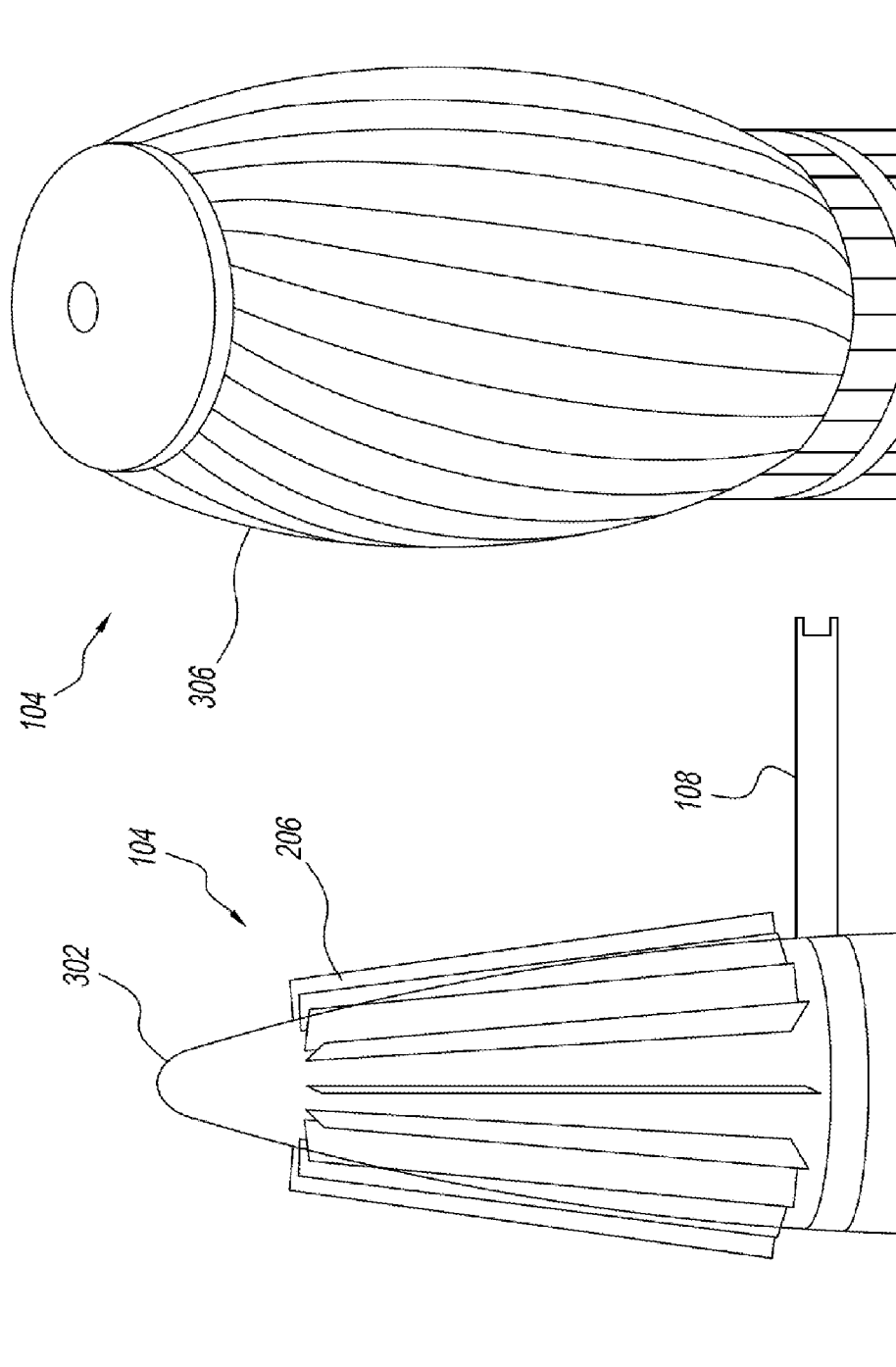

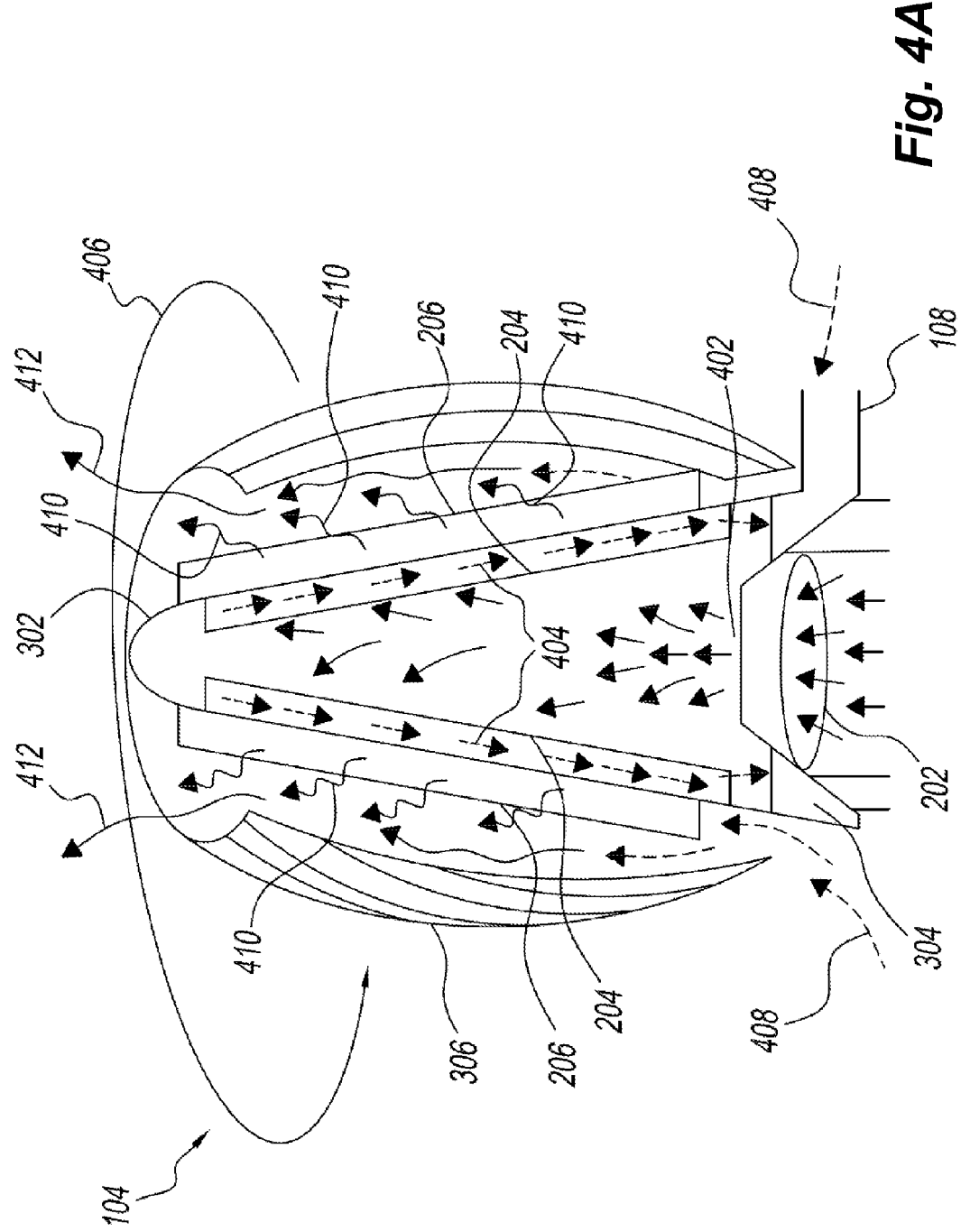

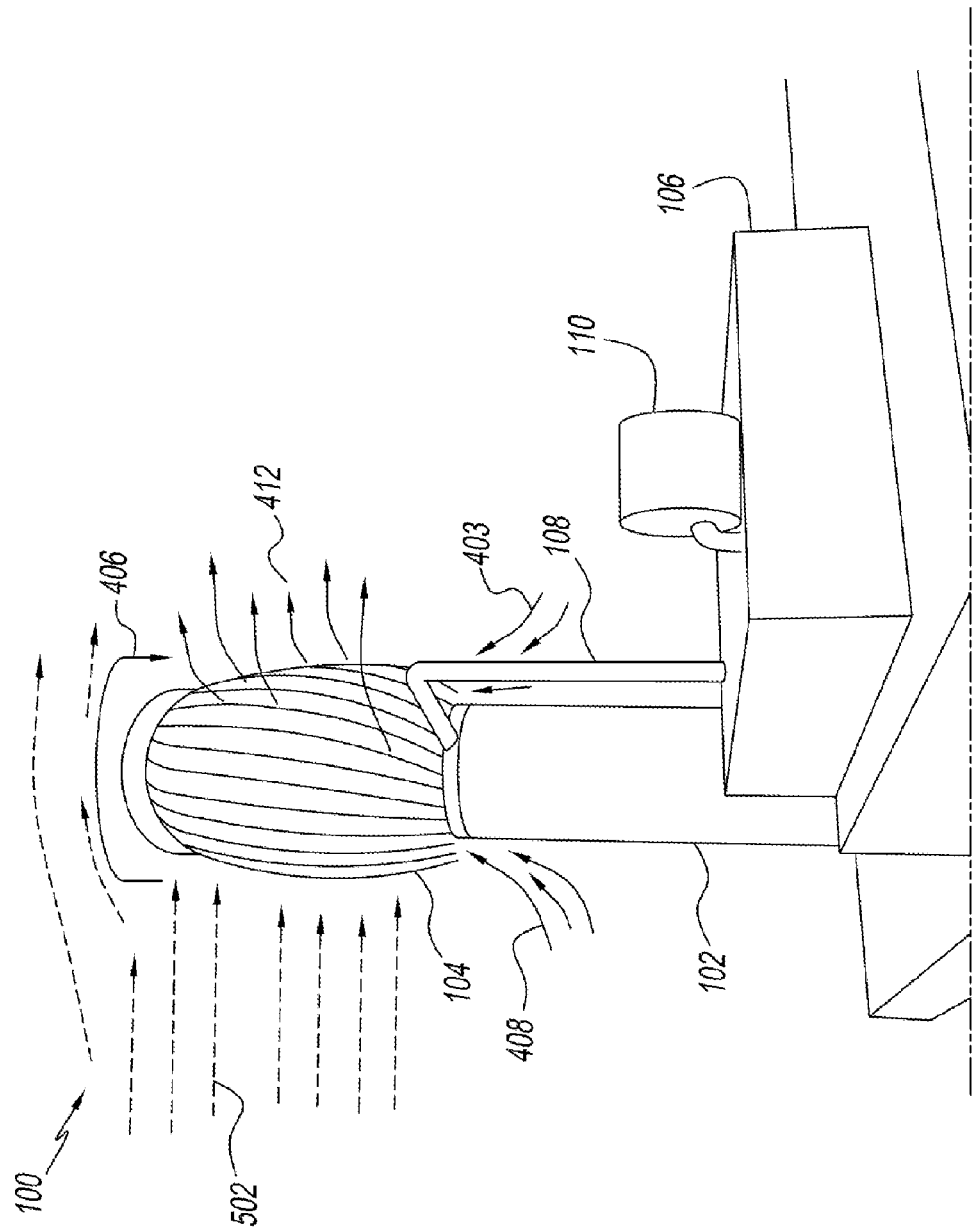

SYSTEM, METHOD, AND APPARATUS FOR WATER DESALINATION

CROSS-REFERENCE TO RELATED APPLICATIONS

The present application is a continuation-in-part of U.S. application Ser. No. 14/631,947, filed Feb. 26, 2015, the entire contents of which are incorporated herein by reference. The present application also claims the benefit of the earlier filing date of U.S. Provisional Application 62/157,843, filed May 6, 2015, the entire contents of which being incorporated herein by reference.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Providing pure water sources to communities throughout the world is an important part of meeting the essential needs of a society. Desalination systems treat salt water and/or impure water sources and output purified water that is able to be consumed by humans and other organisms that rely on freshwater to survive.

SUMMARY

According to an exemplary embodiment, a desalination system includes a vertical column with a lower end submerged into a body of liquid to be treated. The column has a dark-colored outer surface able to absorb electromagnetic energy gained from electromagnetic radiation of the sun, and at least one vacuum compressor is connected to provide a vacuum pressure in the vertical column such that the liquid is drawn into the vertical column through openings in the vertical column. A condensing dome has a main shell and that receives vapor of the liquid in the vertical column via a vapor port joining the vertical column and the condensing dome. A wind-driven outer turbine surrounds the main shell of the condensing dome and draws outside air into a space around the main shell of the condensing dome. A tank is connected to the condensing dome via a pipe and receives desalinated liquid from the condensing dome.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 3A-3D are exemplary illustrations of aspects of a condensing dome, according to certain embodiments;

FIG. 4A is an exemplary illustration of air flow through a condensing dome, according to certain embodiments;

FIG. 5 is an exemplary illustration of air flow through a desalination system, according to certain embodiments;

DETAILED DESCRIPTION

Figure 1:
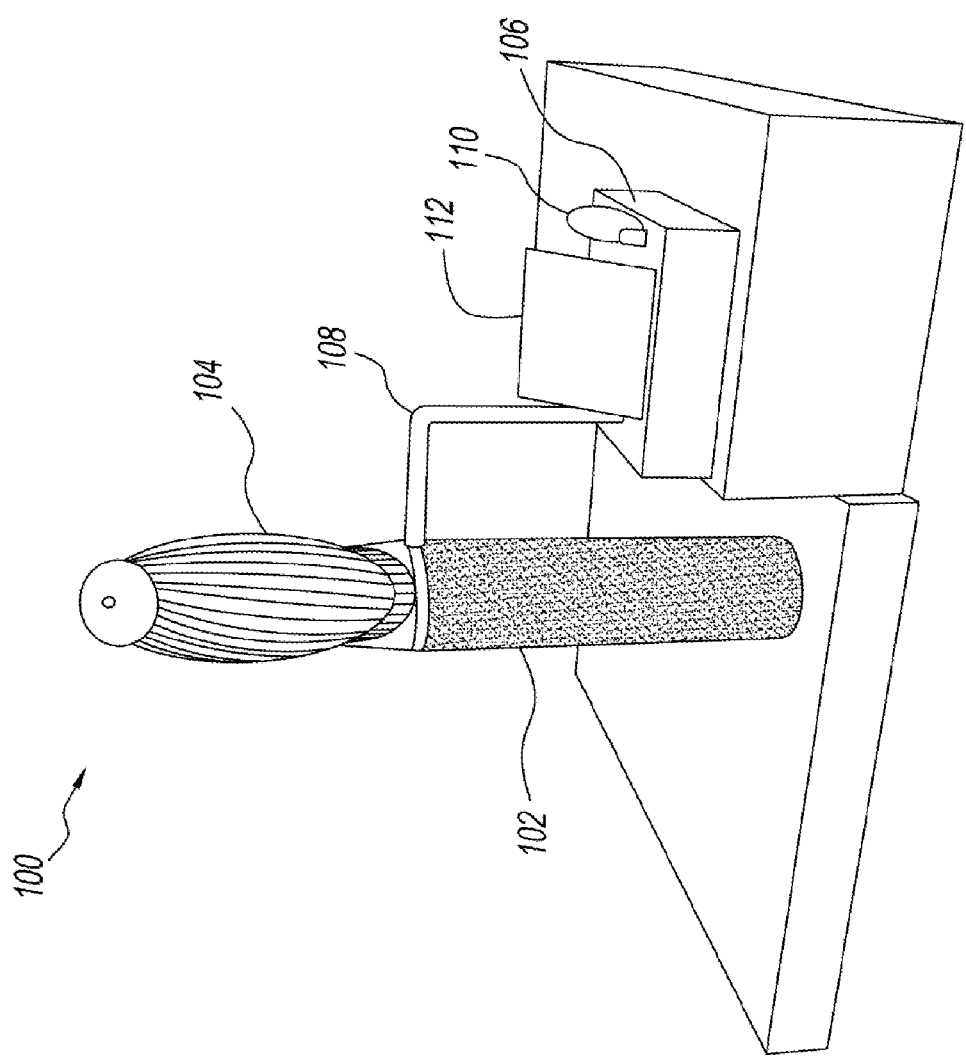
FIG. 1 is an exemplary illustration of a desalination system, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

FIG. 1 is an exemplary illustration of a desalination system 100 according to certain embodiments. The desalination system 100 includes a heating column 102, a condensing dome 104 connected at an upper end of the heating column 102, and a tank 106 that serves as a reservoir for desalinated water or other liquid that has been treated by the desalination system 100. The heating column 102 is submerged or partially submerged in a body of liquid to be treated, such as a lake, river, sea, or other body of water that may be salinized. The heating column 102 functions as a heating chamber where the fluid to be treated is heated until vaporization and rises to enter the condensing dome 104.

According to certain embodiments, the heating column 102 is a hollow tube-like structure, such as a cylinder, that can be circular, elliptical, or any other shape that creates a void for liquid to enter. The heating column 102 can have a diameter that is based on the quantity of liquid being treated by the desalination system 100 during a period of time. In addition, the height of the heating column 102 can be any height, such as approximately 10 meters (33 ft.) above sea level, which corresponds to the maximum height that water will rise in a vacuum where the vacuum pressure is approximately zero bar. The heating column 102 also includes one or more pressure sensors, electric and/or mechanical level sensors to determine the quantity of liquid in the heating column 102, and temperature sensors. For example, circuitry associated with the desalination system 100 can determine a vacuum pressure corresponding to the temperature of the liquid in the heating column 102 that will achieve boiling conditions in the heating column 102.

In some implementations, an outer surface of the heating column 102 is made of a high-emissivity coating, such as a material that is black or dark in color or is painted with black or dark-colored paint. In one example, a ceramic-based, black-pigmented coating is applied to the outer surface of the heating column 102. The dark-colored outer surface of the heating column 102 exhibits properties that approach blackbody emissivity with an emissivity value of one, which means that outer surface of the heating column 102 absorbs approximately 100% of electromagnetic energy that comes in contact with the outer surface of the heating column 102. The dark-colored outer surface of the heating column 102 absorbs energy from the sun, which is transferred to the liquid in the heating column 102 as heat energy. According to certain embodiments, the heating column 102 can be surrounded by an evacuated cylinder to provide vacuum insulation for the heating column 102, which may reduce an amount of heat transfer via convection and conduction and increase an amount heat transfer via radiation.

The condensing dome 104 forms a closed chamber and is connected at the upper end of the heating column 102, and the vaporized fluid enters the condensing dome 104 through a vapor port 202 located between the heating column and the condensing dome. As will be discussed further herein, the condensing dome 104 includes a rotating outer turbine, or fan, surrounding the external surface of the condensing dome 104 that generates air flow across the condensing dome 104 via wind current that rotates the turbine. Heat exchange between the vapor at an inner surface of the condensing dome 104 and air flowing across an outer surface of the condensing dome 104 via the rotating outer turbine causes the vapor to condense into liquid, which is collected and transferred to the tank 106 via a connecting pipe 108. In some implementations, a tank isolation valve (not shown) is positioned in the connecting pipe 108 upstream of the tank 106 so that the tank can be isolated, such as when the tank is in a maintenance condition.

In some implementations where the tank 106 is positioned below a condensation collector (not shown) in the condensing dome 104, the condensed liquid flows from the condensing dome 104 to the tank 106 based on gravitational forces. The condensed liquid can also be drawn into the tank 106 when a vacuum is established at the tank 106. Details regarding the condensation collector are discussed further herein. If the tank 106 is positioned above the condensation collector of the condensing dome 104, a pump can be placed in line with the connecting pipe 108 to pump the condensed liquid from the condensing dome 104 to the tank 106.

In some implementations, the heating column 102 is vertically oriented so that a longitudinal axis of the heating column 102 is perpendicular to the surface of the fluid to be treated. In other implementations, the heating column is angled such that the longitudinal axis of the heating column 102 is at a non-perpendicular angle with the surface of the fluid to be treated so that the condensed liquid flows out of the condensing dome at a faster rate than if the heating column is positioned perpendicularly.

The tank 106 also includes mechanical and/or electronic level indicators that can output a level and/or volume of desalinated liquid in the tank 106. In some implementations, the level indicators can be associated with circuitry to determine when the volume and/or level of liquid in the tank has exceed a predetermined upper level or has fallen below a predetermined lower level and issue alarms when the level of the fluid in the tank 106 is outside the predetermined upper and lower levels. One or more standby tanks (not shown) can also be connected to the tank 106 via pipes and pumps if necessary to provide additional capacity for holding the condensed liquid. For example, if the liquid level reaches the predetermined upper level, the condensed liquid can be transferred to the one or more standby tanks. The standby tanks can also be maintained at the vacuum pressure of the desalination system 100.

According to certain embodiments, a vacuum compressor 110 is connected to the tank 106 to maintain the desalination system 100 at a predetermined vacuum pressure. The vacuum compressor 110 can include one or more pumps and circuitry associated with drawing and maintaining the vacuum pressure within the desalination system 100 at a predetermined vacuum pressure set point. The vacuum compressor 110 can be powered by any type of external power source including solar power from at least one solar panel 112. In some implementations, the at least one solar panel 112 is mounted to a surface of the tank 106 and is electrically connected to the vacuum compressor 110. The solar panel 112 can also charge one or more battery cells that power the vacuum compressor 110 and/or can directly provide power to the vacuum compressor 110. In addition, the vacuum compressor 110 can also be hand powered.

In addition, pressure detectors 101 can be included at one or more locations throughout the desalination system 100 to measure an actual vacuum pressure within the desalination system 100. In some implementations, if a difference between the actual vacuum pressure measured by the pressure detectors and the predetermined vacuum pressure set point is greater than a predetermined threshold, the circuitry associated with the vacuum compressor 110 can output alarms to warn operators of the desalination system 100 that the predetermined vacuum pressure has not been maintained. In some aspects, the circuitry associated with the vacuum compressor 110 can also send controls signals to the vacuum compressor 110 to increase vacuum pressure if the actual vacuum pressure measured by the pressure detectors has fallen by a predetermined amount of pressure.

In some aspects, the height of the liquid in the heating column 102 is based on the vacuum pressure applied to the desalination system 100 by the vacuum compressor 110 and on an average temperature of the liquid in the heating column 102. The average temperature of the liquid in the heating column 102 is based on the amount of heat energy transferred to the liquid via the dark-colored outer surface of the heating column 102, emissivity of the outer surface of the heating column 102, ambient atmospheric temperature, ambient liquid temperature, efficiency of thermal insulation, and the like. For example, the average temperature of the liquid in the heating column 102 may be greater in tropical locations that experience greater amounts of solar irradiance than locations closer to the North or South Poles that do not receive as much direct sunlight as the tropical locations. In one example, the liquid in the heating column 102 is heated to a temperature of approximately 67° F. based on the heat energy transferred to the fluid via the outer surface of the heating column 102 and then to the liquid in the heating column. If a vacuum pressure of 0.2 bar (200 mbar) is applied by the vacuum compressor 110, the liquid will rise to a height of approximately 26.4 ft. in the heating column 102.

Figure 2:
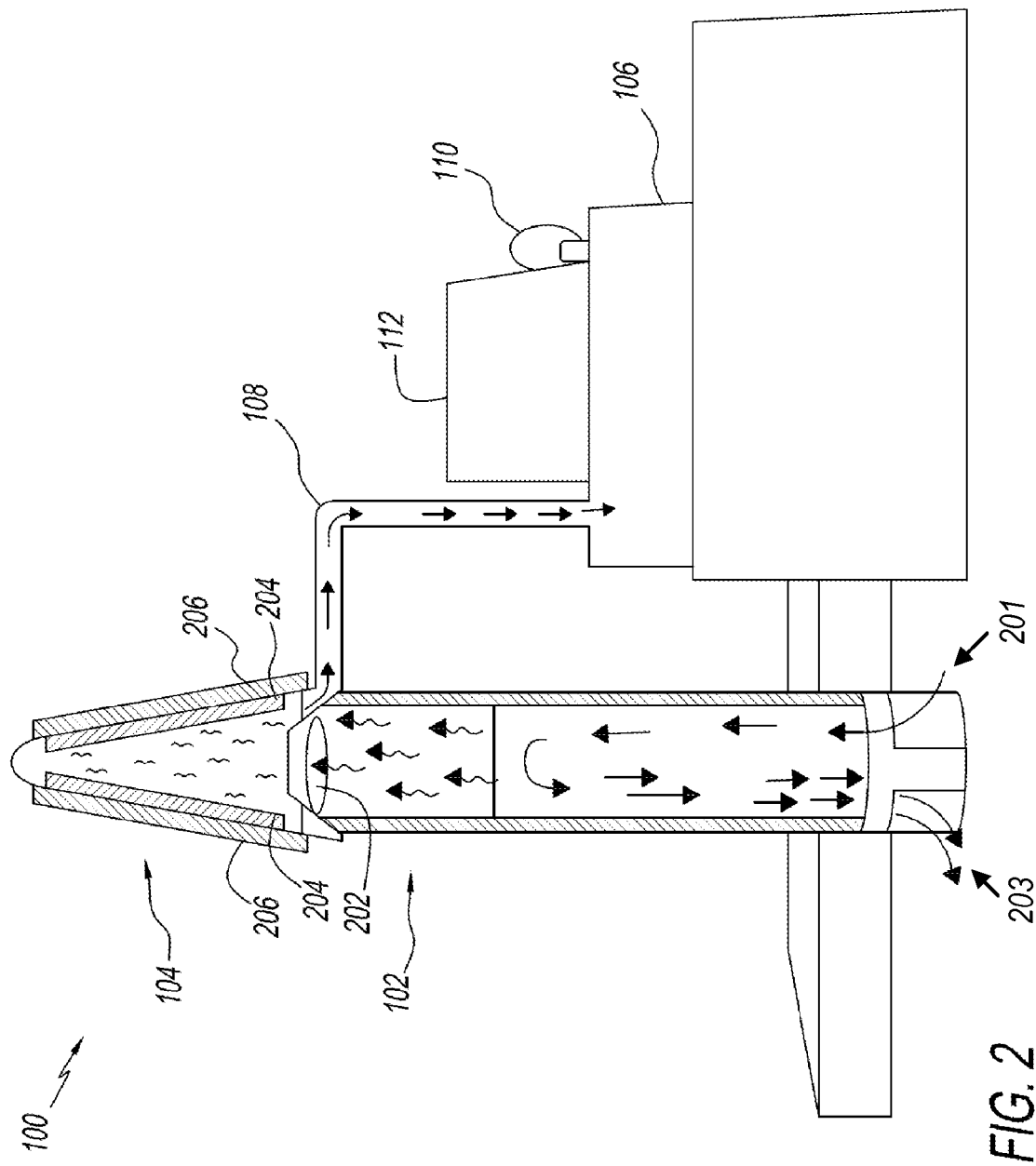
FIG. 2 is an exemplary cross-sectional illustration of fluid flow through a desalination system, according to certain embodiments.

FIG. 2 is an exemplary cross-sectional illustration of fluid flow through the desalination system 100, according to certain embodiments. The heating column 102 is submerged or partially submerged in a body of liquid to be treated. The liquid to be treated enters the heating column 102 via one or more intake openings 201 in the heating column 102 located below an upper water line of the body of fluid to be treated. In some implementations, the submerged end of the heating column 102 is surrounding by a mesh material, such as a net, in order to filter particles and objects that may block the intake openings 201. Due to maintaining the pressure within the desalination system 100 at levels below atmospheric pressure, the fluid is drawn up to a height within the heating column 102 that corresponds to the vacuum pressure being maintained by the vacuum compressor 110. According to certain embodiments, the heating column 102 includes isolation valves (not shown) at the one or more intake openings 201 and/or one or more output openings 203 to prevent liquid from entering and/or exiting the heating column 102 when the desalination system 100 is not in use.

In addition, the temperature of the fluid inside the heating column 102 increases as heat energy is transferred to the fluid via absorption of solar energy by the dark-colored outer surface of the heating column 102, and the density of the fluid is reduced, which causes the heated fluid to rise within the heating column 102. When the temperature of the fluid reaches the vaporization or boiling point, transformed vapor rises into the condensing dome 104 via the vapor port 202. As the vapor is produced, the salinity level within the liquid increases, and natural circulation of the liquid in the heating column 102 is established due to differences in weight and salinity. For example, the weight and density of the liquid fluid increases as the salinity increases due to the evaporation of the fluid. The liquid fluid with increased salinity is pushed to the bottom of the heating column 102 and exits the heating column 102 through the one or more output openings 203 in the heating column below an upper water line of the body of liquid to be treated.

The cross-sectional view illustrated by FIG. 2 also shows the condensing dome 104 with the outer turbine removed in order to illustrate the internal heat transfer fins 204 and the external heat transfer fins 206 attached to the wall of the condensing dome 104. According to certain embodiments, one or more internal heat transfer fins 204 are elongated structures formed around an inner surface of the wall of the condensing dome 104 in order to increase an amount of condensing surface area for the vapor that enters the condensing dome 104 from the heating column 102. One or more external fins 206 are elongated structures formed around an outer surface of the wall of the condensing dome 104 in order to increase the surface area for heat exchange between the vapor within the condensing dome 104 and the air flowing across the external fins 206 via the outer turbine. The internal fins 204 and external fins 206 can be perpendicular to the walls of the condensing dome 104 or angled. In addition, the internal fins 204 and external fins 206 can have any shape or design that optimizes heat transfer properties of the condensing dome 104.

FIGS. 3A-3D are exemplary illustrations of aspects of the condensing dome 104, according to certain embodiments. FIG. 3A is an exemplary illustration of a cross-section of the condensing dome 104 with the outer turbine removed to the internal heat transfer fins 204 and external fins 206. The condensing dome 104 has a fluid-tight main shell 302 which is a primary structure within which vapor condensation occurs. The main shell 302 can have a tapered-cone shape or any shape that can accommodate the internal heat transfer fins 204, external fins 206, and an outer turbine that surrounds the main shell 302. In some implementations, the dimensions of the main shell 302 can be based on desired rates of fluid desalination, size of the heating chamber 102, and the like. According to one embodiment, the main shell 302 has a height of approximately 20 ft. with a diameter of approximately 8 ft., but the height and diameter of the main shell 302 can be greater than or less than the dimensions described herein.

According to some implementations, the internal heat transfer fins 204 are the elongated structures formed around the inner surface of the main shell 302 according to predetermined patterns that increase the total condensing surface area of the condensing dome 104. The internal heat transfer fins 204 can be blade-like structures that extend from an approximate top to an approximate bottom of the main shell 302 of the condensing dome 104. In addition, the external fins 206 are elongated structures formed around the outer surface of the main shell 302 according to predetermined patterns that promote increased heat transfer between the vapor within the condensing dome 104 and the air flowing across the external fins 206 via the outer turbine. The external fins 206 are also blade-like structures that extend from an approximate top to an approximate bottom of the main shell 302 of the condensing dome.

FIG. 3B is an exemplary illustration of the vapor port 202, according to certain embodiments. The vapor port 202 is an opening at the bottom of the condensing dome 104 that separates the heating column 102 from the condensing dome 104. The fluid that has been evaporated in the heating column 102 enters the condensing dome 104 via the vapor port. A condensation collector 304 surrounds the vapor port 202 and is a convex annulus in shape to provide a collection reservoir for the vapor that is condensed into liquid within the condensing dome 104. The connecting pipe 108 connects to the condensing dome 104 at a location that corresponds to the location of the condensation collector 304 so that the condensed liquid can be transferred from the collection condenser 304 to the tank 106.

FIG. 3C is an exemplary illustration of the condensing dome 104 with the outer turbine removed, according to certain embodiments. As stated previously, the external fins 206 are blade-like structures that extend from an approximate top to an approximate bottom of the main shell 302 of the condensing dome. The external fins 206 are formed around the outer surface of the main shell 302 according to predetermined patterns that promote increased heat transfer between the vapor within the condensing dome 104 and the air flowing across the external fins 206 via the outer turbine. In one implementation, the external fins 206 are equally spaced around the circumference of the outer surface of the main shell 302 of the condensing dome 104.

FIG. 3D is an exemplary illustration of the outer turbine 306 of the condensing dome 104, according to certain embodiments. The outer turbine 306 is a wind-driven fan, such as a turbine air fan, that surrounds the external fins 206 of the condensing dome 104. The outer turbine 306 increases the volume of air passing over the external fins 206, which causes an increase in the amount of heat rejected from the external fins 206 during the heat exchange between the vapor inside the condensing dome 104 and the air flowing across the external fins 206. In some implementations, the direction of rotation of the outer turbine 306 is based on the direction of wind flow. As the rejected heat is transferred from the external fins 206 to the air flowing across the external fins 206, the heated air escapes from the condensing dome 104 via one or more openings in the outer turbine 306. In some implementations, the heated air escapes from the condensing dome 104 through spaces between blades of the outer turbine 306.

FIG. 4A is an exemplary illustration of the flow of water, vapor and air through the condensing dome 104, according to certain embodiments. As the liquid to be treated is evaporated in the heating column 102, the resulting vapor 402 enters the main shell 302 of the condensing dome 104 through the vapor port 202. As the vapor 402 comes in contact with the internal heat transfer fins 204 that are lower in temperature than the vapor 402, the vapor 402 gives up heat and condenses into desalinated liquid 404 which flows along the inner surface of the main shell 302 of the condensing dome and is collected by the condensation collector 304. The desalinated liquid 404 is transported to the tank 106 via the connecting pipe 108 connected to the condensation collector 304.

The outer turbine 306 is rotated by the wind in a direction 406 based on the direction of wind flow. As the outer turbine 306 rotates, outside air 408 is pulled into the condensing dome 104 between the outer turbine 306 and the external fins 206 via an axial fan connected at a lower end of the outer turbine 306 between outer turbine 306 and the main body 302 of the condensing dome 104 such that the axial fan shares a rotational axis with the outer turbine 306. In some implementations, the axial fan is connected to a bearing collar that supports the outer turbine 306 where it is connected to the heating column 102. For purposes of clarity of the drawing, the axial fan is not shown in FIG. 4A but includes blades oriented to pull outside air vertically upward through the space between the outer turbine 306 and the condensing dome 104.

Figure 4B:
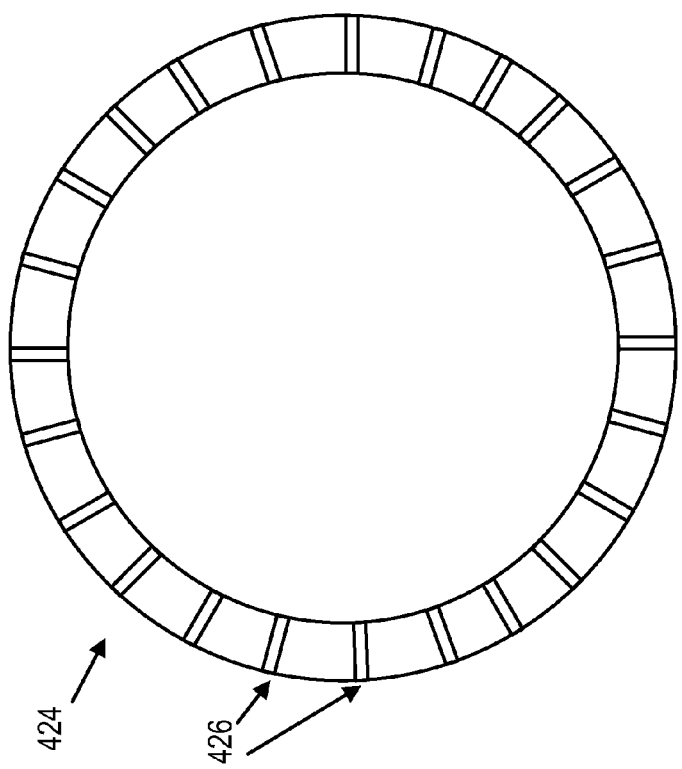
FIGS. 4B-4C are exemplary illustrations of an axial fan, according to certain embodiments.
Figure 4C:
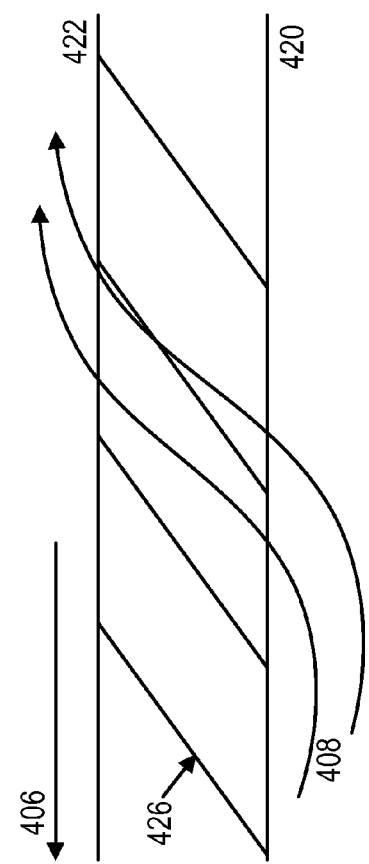

FIG. 4B is an exemplary illustration of an overhead view of an axial fan 424 that is connected to the lower end of the outer turbine 306 according to certain embodiments. The axial fan includes a plurality of angled fan blades 426 that create a pressure differential on either side of the axial fan 424 which cause the outside air 408 to be pulled upward into the space between internal surfaces of fan blades of the outer turbine 306 and the external heat transfer fins 206 of the condensing dome 104 as the axial fan rotates. For example, FIG. 4C is an exemplary diagram that illustrates the air flow with respect to the axial fan 424. The angled fan blades 426 are arranged at blade angles that produce a pressure differential between an external side 420 of the axial fan 424 and an internal side 422 of the axial fan 424. The pressure on the external side 420 is less than the pressure on the internal side 422 such that the outside air 408 is drawn in an axial direction from the external side 420 to the internal side 422 of the axial fan 424 as the axial fan 424 rotates in the direction of wind flow 406.

Referring back to FIG. 4A, the outer turbine 306 increases the volume of outside air 408 passing over the external fins 206, which causes an increase in the amount of rejected heat 410 from the external fins 206 during the heat exchange between the vapor 402 inside the condensing dome 104 and the outside air 408 flowing across the external fins 206. The temperature of the outside air 408 increases as the outside air 408 passes over the external fins 206 and absorbs the rejected heat 410 from the external fins 206. The heated outside air 412 exits the condensing dome 104 through at least one opening between the outer turbine 306 and the external fins 206.

FIG. 5 is an exemplary illustration of air flow through a desalination system 100, according to certain embodiments. The outer turbine 306 is rotated by the wind in a direction 406 based orientation angles of the fan blades of the outer turbine 306. As shown in FIG. 5, with respect to the orientation of the desalination system 100, the wind flow 502 direction is from left to right across the outer turbine 306 of the condensing dome 104, and the outer turbine rotates in a direction 406 that is counter-clockwise. As the outer turbine 306 rotates, outside air 408 is drawn into the condensing dome 104 between the outer turbine 306 and the external fins 206. As the rejected heat 410 from the external fins 206 is transferred to the outside air 408, the heated outside air 412 exits the condensing dome 104 through the at least one opening between the outer turbine 306 and the external fins 206. In some implementations, the heated outside air 412 exits the condensing dome 104 through spaces between the blades of the outer turbine 306.

Figure 6:
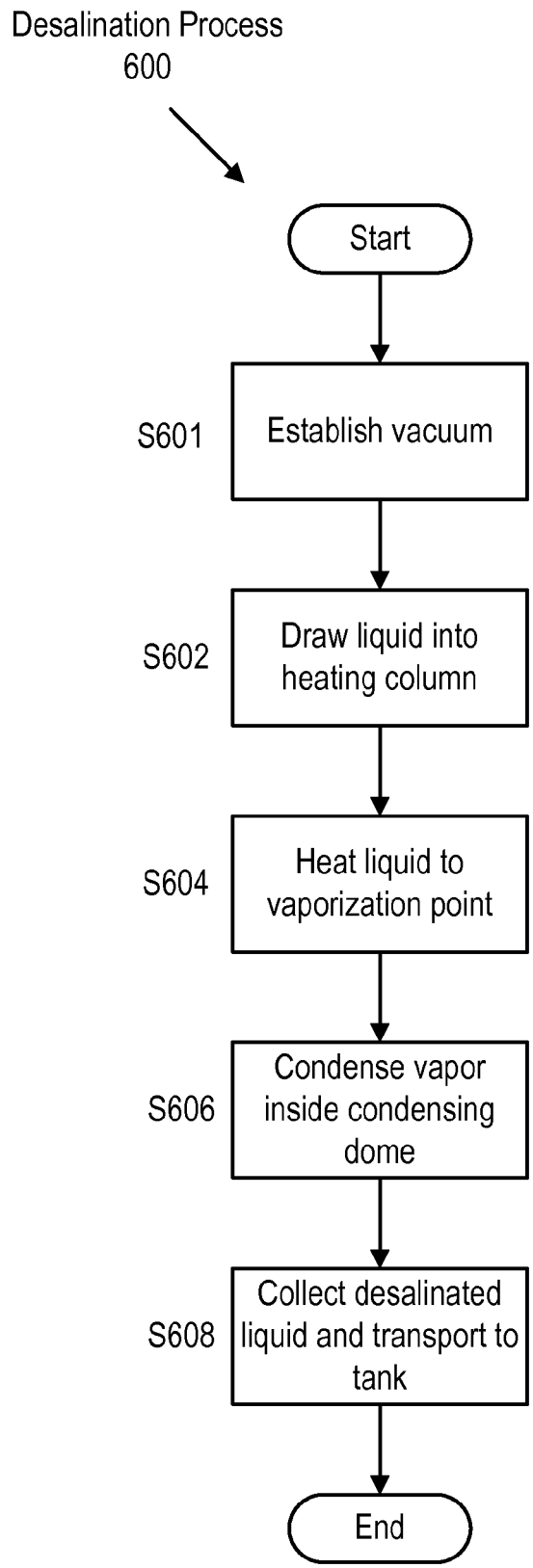
FIG. 6 is an exemplary flowchart of a desalination process, according to certain embodiments.

FIG. 6 is an exemplary flowchart of a desalination process 600, according to certain embodiments. At step S601, a vacuum is established in the desalination system 100 via the vacuum pressure 110. The vacuum compressor 110 can include one or more pumps and circuitry associated with drawing and maintaining the vacuum pressure within the desalination system 100 at the predetermined vacuum pressure set point. The vacuum compressor 110 can be powered by any type of external power source including solar power from at least one solar panel 112. In some implementations, the at least one solar panel 112 is mounted to a surface of the tank 106 and is electrically connected to the vacuum compressor 110. The solar panel 112 can also charge one or more battery cells that power the vacuum compressor 110. In addition, the vacuum compressor 110 can also be hand powered.

At step S602, liquid to be treated is drawn into the heating column 102 via the vacuum established in the desalination system 100 via the vacuum compressor 110. In some implementations, the heating column 102 is submerged or partially submerged in the body of liquid to be treated, such as a lake, river, sea, or other body of water that may be salinized. The liquid to be treated enters the heating column 102 via one or more openings in the heating column 102 located below an upper water line of the body of fluid to be treated. Due to maintaining the pressure within the desalination system 100 below atmospheric pressure, the fluid is drawn up to a height within the heating column 102 that corresponds to the vacuum pressure being maintained by the vacuum compressor 110.

At step S604, the liquid in the heating column 102 is heated to the point of vaporization. In some implementations, the outer surface of the heating column 102 is made of a material that is black or dark in color or is painted with black or dark-colored paint. The dark-colored outer surface of the heating column 102 exhibits properties that approximate blackbody emissivity, which means that outer surface of the heating column 102 absorbs approximately 100% of electromagnetic energy that comes in contact with the outer surface of the heating column 102. The dark-colored outer surface of the heating column 102 absorbs energy from the sun, which is transferred to the liquid in the heating column 102 as heat energy. The temperature of the fluid inside the heating column 102 increases as heat energy is transferred to the liquid via the dark-colored outer surface of the heating column 102, and the density of the liquid is reduced, which causes the heated liquid to rise within the heating column 102.

When the temperature of the fluid reaches the vaporization or boiling point, transformed vapor rises into the condensing dome 104 via the vapor port 202. As the vapor is produced, the salinity level within the liquid increases, and natural circulation of the liquid in the heating column 102 is established due to differences in weight and salinity. For example, the weight of the liquid fluid increases as the salinity increases due to the evaporation of the fluid. The liquid with increased salinity is pushed to the bottom of the heating column 102 and exits the heating column 102 through the one or more openings in the heating column below an upper water line of the body of fluid to be treated.

At step S606, vapor condensation occurs within the condensing dome 104 as the vapor enters the main body 302 of the condensing dome 104 via the vapor port 202. As the vapor 402 comes in contact with the internal heat transfer fins 204 that are lower in temperature than the vapor 402, the vapor 402 condenses into desalinated liquid 404 which is collected by the condensation collector 304 as the desalinated liquid 404 falls to the bottom of the main shell 302.

The outer turbine 306 is rotated by the wind in a direction 406 based on the direction of wind flow. As the outer turbine 306 rotates, outside air 408 is pulled into the condensing dome 104 between the outer turbine 306 and the external fins 206. The outer turbine 306 increases the volume of outside air 408 passing over the external fins 206, which causes an increase in the amount of rejected heat 410 from the external fins 206 during the heat exchange between the vapor inside the condensing dome 104 and the outside air 408 flowing across the external fins 206. The temperature of the outside air 408 increases as the outside air 408 passes over the external fins 206 and absorbs the rejected heat 410 from the external fins 206. The heated outside air 412 exits the condensing dome 104 through at least one opening between the outer turbine 306 and the external fins 206.

At step S608 the desalinated liquid 404 is collected at the condensation collector 304 and transported to the tank 106 via the connecting pipe 108. In some implementations where the tank 106 is positioned below the condensing dome 104, the condensed liquid flows from the condensing dome 104 to the tank 106 based on gravitational forces. If the tank 106 is positioned above the condensing dome 104, a pump can be placed in line with the connecting pipe 108 to pump the condensed liquid from the condensing dome 104 to the tank 106.

The desalination system 100 receives impure liquid, such as salt water, and outputs purified liquid that can be consumed by humans and/or other organisms that rely on freshwater for survival, according to certain embodiments. By using of solar energy to power the vacuum compressor 110 and also heat the liquid in the heating column 102, the desalination system 100 may require small amounts of external energy for operation and can be implemented in locations with minimal access to electricity. In addition, in some implementations, the desalination system 100 can be a portable system that can be constructed and deconstructed based on time of year, water shortages, and the like.

Figure 7:
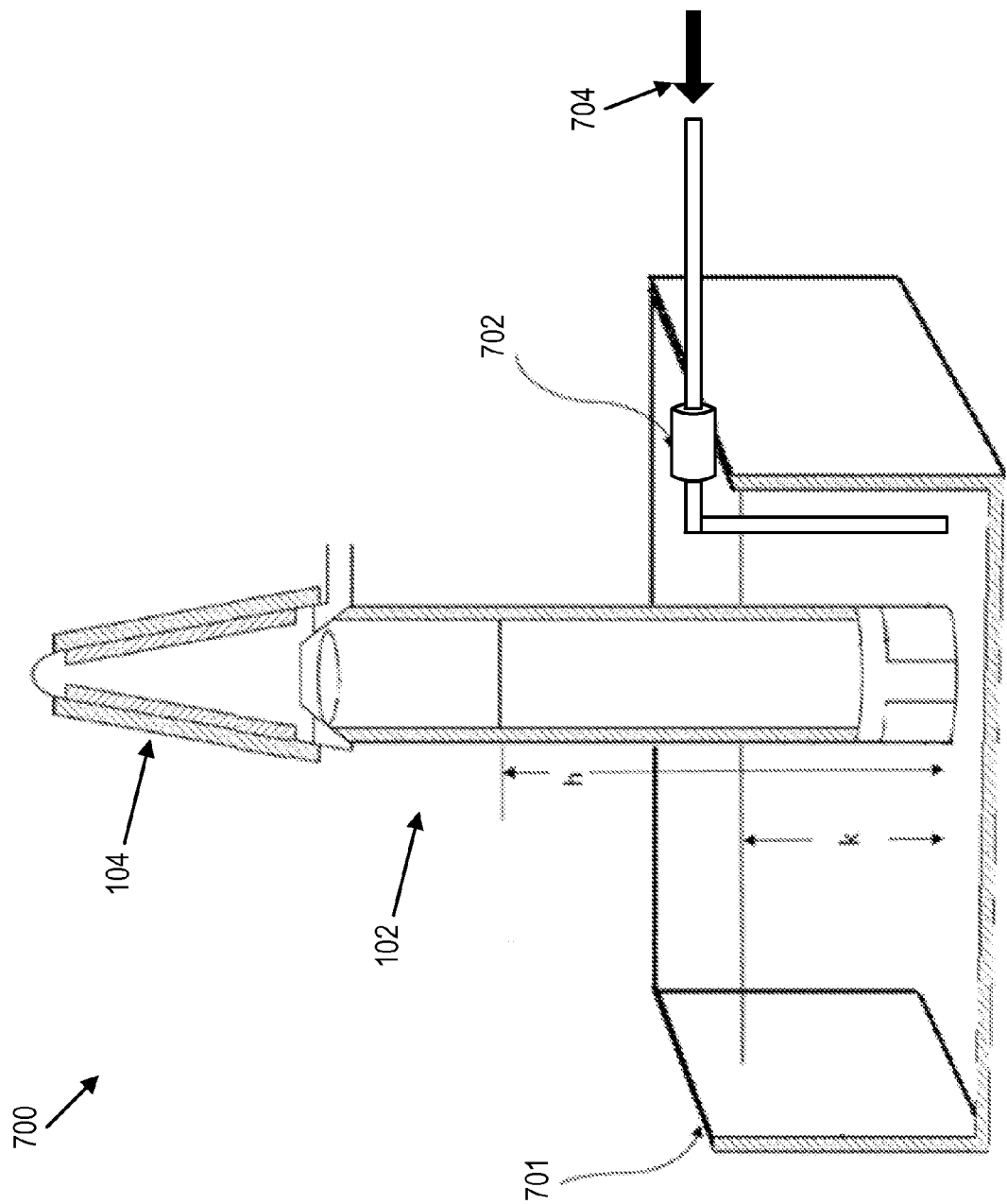
FIG. 7 is an exemplary illustration of a desalination system, according to certain embodiments.

FIG. 7 is an exemplary illustration of a desalination system 700, according to certain embodiments. The desalination system 700 includes the heating column 102 that is submerged within a water bound 701, which can also be referred to as a tank or reservoir having predetermined dimensions that holds a predetermined volume of liquid to be treated. The water bound 701 also includes an inlet pump 702 that pumps the liquid to be treated into the water bound 701 to perform the desalination process 600. According to some implementations, a height, h, and pressure, P, within the heating column 102 is based on a level, k, of liquid to be treated within the water bound 701. The level k is controlled via the inlet pump 702 that receives a control signal from circuitry associated with determining the height h and pressure P of liquid within the heating column 102. For example, the pressure P within the heating column can be determined according to the following: $P=P_{atm}-[(h*\text{density of fluid to be treated}*\text{gravity})-(k*\text{density of fluid to be treated}*\text{gravity})]=P_{atm}-[(\text{density of fluid to be treated}*\text{gravity})(h-k)]$. The height h of liquid within the heating column 102 and height k of the liquid within the water bound 701 can be determined by one or more level indicators. In addition, the inlet pump 702 can be powered by the at least one solar panel 112 and/or other external mechanical/electrical power sources. The desalination system 700 also includes the components discussed previously with respect to the desalination system 100.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The invention claimed is:

1. A desalination system comprising:
a heating column with a lower end that may be submerged into a liquid to be treated, wherein the column has an outer surface able to absorb electromagnetic energy;
a reservoir having predetermined dimensions configured to hold the liquid to be treated;
an inlet pump configured to maintain a predetermined level of a liquid to be treated within the reservoir;
a vacuum compressor connected to provide a vacuum pressure in the heating column such that the liquid may be drawn into the heating column through at least one opening in the heating column;
a condensing dome having a main shell and configured to receive vapor of the liquid in the vertical column via a vapor port joining the vertical column and the condensing dome;
one or more internal elongated fins spaced at predetermined patterns around an inner surface of the main shell of the condensing dome;
one or more external elongated fins spaced at predetermined patterns around an outer surface of the main shell of the condensing dome;
a wind-driven outer turbine surrounding the main shell of the condensing dome and configured to draw outside air into a space around and between an inner surface of the wind-driven outer turbine and a surface of the main shell of the condensing dome;
a connecting pipe; and
a tank connected to the condensing dome via the connecting pipe, the tank being configured to receive desalinated liquid from the condensing dome.

2. The system of claim 1, wherein the height of the heating column is approximately 33 feet.

3. The system of claim 1, wherein the outer surface of the heating column has a color such that the heating column absorbs approximately 100% of electromagnetic energy coming into contact with it.

4. The system of claim 1, wherein the vacuum compressor is connected to the tank.

5. The system of claim 4, wherein the vacuum compressor is directly connected to the tank.

6. The system of claim 5, wherein the heating column includes one or more pressure detectors to measure an actual vacuum pressure within the desalination system.

7. The system of claim 6, further comprising
circuitry configured to
receive the actual vacuum pressure from the one or more pressure detectors, and
output alarms when a difference between the actual vacuum pressure and a predetermined vacuum pressure is greater than a predetermined threshold.

8. The system of claim 7, wherein the circuitry is further configured to issue control signals to the vacuum compressor to cause the vacuum compressor to increase the vacuum pressure drawn when the difference between the actual vacuum pressure and the predetermined vacuum pressure is greater than the predetermined threshold.

9. The system of claim 4, further comprising:
at least one solar panel,
wherein the vacuum compressor receives electrical power from the at least one solar panel.

10. The system of claim 1, wherein the tank includes one or more level indicators and circuitry to determine at least one of a level or volume of the desalinated liquid in the tank.

11. The system of claim 10, wherein the circuitry determines the level of the desalinated liquid in the tank, and
issues alarms when the level of the desalinated liquid in the tank is at least one of greater than a predetermined upper threshold or less than a predetermined lower threshold.

12. The system of claim 1, wherein the condensing dome includes a condensation collector connected to a lower end of the condensing dome.

13. The system of claim 12, wherein the connecting pipe connects to the condensation collector.

14. The system of claim 13, wherein the tank is positioned at a location that is lower than of the condensation collector.

15. The system of claim 1, further comprising circuitry associated with the inlet pump configured to determine the predetermined level of the liquid to be treated within the reservoir based on at least one of a height and pressure of liquid within the vertical column.

16. The system of claim 1, wherein the outer turbine includes an axial fan to drive outside air into the space around the main shell of the condensing dome.

17. A desalination apparatus comprising:
a heating column with a lower end that may be submerged into liquid to be treated, wherein the column has an outer surface able to absorb electromagnetic energy;
a reservoir having predetermined dimensions configured to hold the liquid to be treated;
an inlet pump configured to maintain a predetermined level of a liquid to be treated within the reservoir;
a vacuum compressor connected to provide a vacuum pressure in the heating column such that the liquid may be drawn into the vertical column through at least one opening in the heating column;
a condensing dome having a main shell to receive vapor of a liquid in the heating column via a vapor port joining the heating column and the condensing dome;
one or more internal elongated fins spaced at predetermined patterns around an inner surface of the main shell of the condensing dome;
one or more external elongated fins spaced at predetermined patterns around an outer surface of the main shell of the condensing dome; and
a wind-driven outer turbine surrounding the main shell of the condensing dome, the wind-driven outer turbine being configured to draw outside air into a space around and between an inner surface of the wind-driven outer turbine and a surface of the main shell of the condensing dome.

* * * * *